United States Patent [19]

Gendreu

[11] Patent Number: 4,719,464

[45] Date of Patent: Jan. 12, 1988

[54] ANGULAR SCINTILLATION REDUCTION DEVICE IN A RADAR AND A RADAR CONTAINING SUCH A DEVICE

[75] Inventor: Robert Gendreu, Paris, France

[73] Assignee: Thomson CSF, Paris, France

[21] Appl. No.: 129,372

[22] Filed: Mar. 13, 1980

[30] Foreign Application Priority Data

Apr. 26, 1979 [FR] France .................. 79 10647

[51] Int. Cl.$^4$ ............................................. G01S 13/44
[52] U.S. Cl. ................................................. 342/149
[58] Field of Search ...................... 343/16 M; 342/149

[56] References Cited

U.S. PATENT DOCUMENTS 3,579,239  5/1971  Purcell, Jr. et al. ............ 342/149 X
4,220,953  9/1980  Carré ............................ 343/16 M
4,486,756 12/1984  Peregrim et al. ................ 342/149

Primary Examiner—T. H. Tubbesing
Attorney, Agent, or Firm—Cushman, Darby & Cushman

[57] ABSTRACT

An angular scintillation reduction device used more especially in radar equipments making deviation measurements.

It contains a circuit (60) receiving the video outputs of a radar receiver, the sum $\Sigma$, range D and deviation measurement $\epsilon$ signals respectively on three terminals (3, 28 and 2). It delivers on a terminal (30) the values of the deviation measurement signal $\epsilon$ corresponding to the maximum values of the sum signal $\Sigma$.

It is applicable to all electromagnetic detection equipments which make deviation measurements.

6 Claims, 2 Drawing Figures

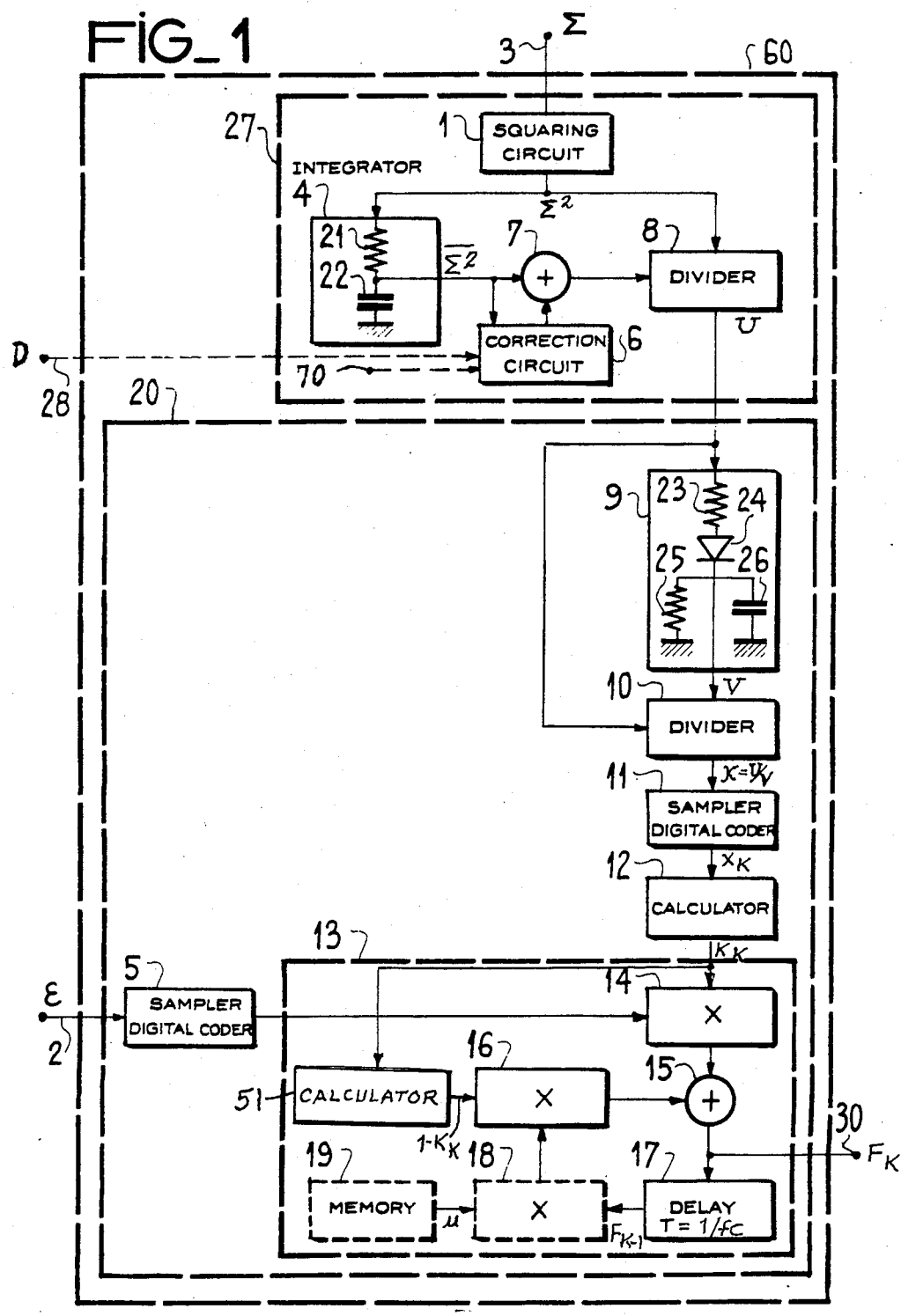
FIG_1

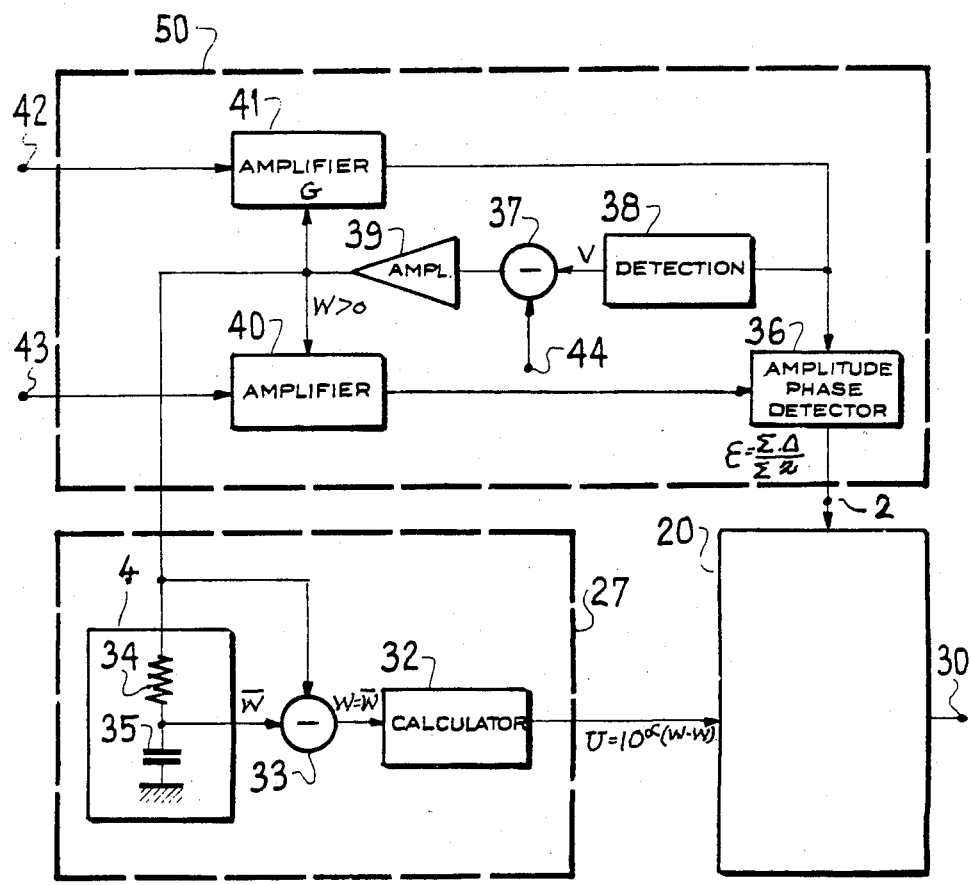

ANGULAR SCINTILLATION REDUCTION DEVICE IN A RADAR AND A RADAR CONTAINING SUCH A DEVICE

The present invention covers an angular scintillation reduction device used more especially in deviation measurement radars.

The methods for the measurement of the angular position of a target by a radar, also known as a method of deviation measurement or a monopulse method, are based on the comparison of two or more different diagrams with the antenna aimed at the same target. There may be one or more measurements, in elevation and bearing for example.

The angular measurements are determined from the amplitude of an electric signal which represents the measurement. Apart from radar noise, the angular measurements are upset by a scintillation error, which is mainly due to the complex character of the target that may be assimilated to the association of several elementary reflectors. This error limits the performance of radar systems and in particular automatic tracking systems.

A radar system with means for measuring the angle or angular deviation gives at least two antenna diagrams on reception.

They are used in at least two reception channels normally known as the sum channel, which delivers a sum signal $\vec{\Sigma}$, and the difference channel, which delivers a difference signal $\vec{\Delta}$. The means for calculating the angular measurements generally produce the quotient $$\frac{\vec{\Sigma} \cdot \vec{\Delta}}{|\vec{\Sigma}|^2}.$$

The quotient called $\epsilon$ is a measure of the off-center angle of the target as detected with respect to the axis of the two antenna diagrams. Filtering of the angular measurement errors may be done by means of simple linear and non-linear filters. However, the residual level of angular measurement error is still not negligable for these types of filter when it is a question of scintillation.

The present invention proposes to correct this disadvantage.

The device in accordance with the invention contains at least a means, which receives from the deviation measurement radar receiver the sum $\Sigma$, difference $\Delta$ and deviation measurement $\epsilon$ signals, this last one being produced from the $\Sigma$ and $\Delta$ signals, and only retains in the measurements of the $\epsilon$ signal those corresponding to the maximum values of the $\Sigma$ signal.

Other advantages and characteristics of the present invention will appear from the description which follows together with the figures which show:

in FIG. 1, the device in accordance with the invention used with a fixed gain deviation measurement radar receiver, in FIG. 2, the device in accordance with the invention used at the output of a deviation measurement radar receiver with an automatic gain control circuit.

A target may be reduced to a small number of reflecting surfaces in the direction of the radar. Let $M_i$ and $\phi_i$ be the amplitude and phase of the wave reflected by one of these small surfaces on the target.

The sum $\Sigma$ and difference $\Delta$ signals may be written:
$$\Sigma = \Sigma_i M_i e^{j\phi_i}$$

$$\Delta = \Sigma_i M_i \theta_i e^{j\phi_i}$$

in which $\theta_i$ represents the angular deviation of the direction of a reflecting surface under consideration with respect to the axis of the two antenna diagrams.

The corresponding deviation measurement signal is then written:

$$\epsilon = \frac{\Sigma_{i,K} M_i M_k \theta_i \cos(\phi_i - \phi_K)}{\Sigma_{i,K} M_i M_k \cos(\phi_i - \phi_K)}$$

In the special case in which $\phi_i - \phi_K = 0$, which corresponds to a reflection in phase of the various surfaces of the target and hence to zero evolutions of this target with respect to the radar, the sum signal $\Sigma$ is a maximum and the deviation measurement signal $\epsilon$ becomes:

$$\epsilon = \frac{\Sigma_i M_i \theta_i}{\Sigma_i M_i}$$

In all other cases, in particular when the instantaneous signal is small, because of the relative variations of the phases $\phi_i$ and $\phi_K$, the deviation measurement signal $\epsilon$ may suffer big fluctuations around the radioelectric center of gravity of the target.

The device in accordance with the invention proposes to correct this disadvantage by selecting deviation measurements corresponding to values of the $\Sigma$ signal greater than an increasing, predetermined threshold, thus making it possible to reduce the fluctuations in the target direction as seen by the radar.

FIG. 1 shows the schematic diagram of the device in accordance with the invention which makes this selection of the values representing the deviation measurement signal $\epsilon$.

It contains a circuit 60, which is divided into a circuit 27, that receives the sum signal $\Sigma$ and the range D of the target and calculates the signal $v$ $U=\Sigma^2/\overline{\Sigma}^2$ where $\overline{\Sigma}$ represents the mean value of the sum signal $\Sigma$, and a circuit 20, that receives signal U and the deviation measurement signal $\epsilon$. Circuit 27 contains a squaring circuit 1 connected to an integrating circuit 4, which includes, for example, a resistor 21 and a capacitor 22, an adder circuit 7, a divider circuit 8 and possibly a dynamic error correction circuit 6.

Circuit 20 contains two identical circuits 5 and 11 for sampling and digital coding, a peak detection circuit 9, which includes, for example, two resistors 23 and 25, a diode 24 and a capacitor 26, a divider circuit 10, a circuit 12, which calculates a predetermined function f from binary words $x_k$ applied to its input, a circuit 13, which includes a multiplier circuit 14, an adder circuit 15, a circuit 17, which introduces a predetermined delay, two multiplier circuits 16 and 18, a memory 19 and a circuit 51 which calculates $1-K_k$, where $K_k$ is the input signal to this circuit.

This device operates as follows:

Signals $\Sigma$ and D coming from the receiver are available on terminals 3 and 28 respectively. Circuit 1 connected to terminal 3 delivers a signal $\Sigma^2$, which is applied to the integrator 4 of time constant $\tau = RC$ and to one of the two inputs of divider circuit 8 whose other input is connected to the output of integrator 4 through a summation circuit 7. The output of integration circuit 4 delivers the mean value of the signal $\Sigma^2$, which is noted as $\overline{\Sigma}^2$ and is applied to one of the two inputs of adder circuit 7 and possibly to a circuit 6 which also receives the radar-target range D from terminal 28.

Circuit 6 calculates the quantity—$4.\overline{\Sigma}^2.(v_r/D).R.C.$ in which R and C are the value of the resistance 21 and of the capacitor 22 respectively, and $v_r$ is the measurement of the estimated radial speed of the target which may come from a circuit outside the device in accordance with the invention through a terminal 70. The output of circuit 6, when applied to the second input of adder circuit 7, delivers a corrective term which is added algebraically to the value of signal $\overline{\Sigma}^2$ and makes it possible to compensate for the delay introduced by integration circuit 4. Divider circuit 8 delivers a signal $U=\Sigma^2/\overline{\Sigma}^2$, which corresponds to the standardized fluctuations of the signal $\Sigma^2$ and is applied to the first input of divider circuit 10 and peak detector circuit 9. Circuit 9, by means, for example, of two resistors 23 and 25, diode 24 and capacitor 26, makes it possible to retain only the signal V which corresponds to peak signal U.

Divider circuit 10, which is connected to circuit 9, then delivers the signal $x=U/V$ to circuit 11, which samples signal x and codes digitally the amplitude of each of the samples $s_k$. The numbers $x_k$ less than 1 then act as a factor of merit for the values of deviation measurement signal $\epsilon$. Hence the measurement of $\epsilon$ will be considered as good if the associated coefficient $x_k$ is closed to 1. It is sometimes necessary to increase the speed of variation of factor of merit $x_k$ to allow a bigger selection of good measurements of signal $\epsilon$. For this purpose, a factor of merit defined as $K_k=f(x_k)$ is used in preference to the value $x_k$, f being a predetermined function. Experimental measurements have shown that function f can be chosen preferentially, but not restrictively, such that: $K_k=e^{-\beta(1-x_k)n}$ in which $\beta$ is a positive number, 5.5 for example, and n:3 for example.

The output of circuit 12 which calculates factor of merit $K_k$ is connected to one of the two inputs of a first multiplier circuit 14. The second multiplier circuit 16 has an input circuit 51 performing the subtraction $1=K_k$ from the output signal of the calculating circuit 12. Multiplier circuit 14 receives at its second input deviation measurement signal $\epsilon$, which appears at input terminal 2 and was previously sampled and coded in sampling and coding circuit 5, this circuit 5 converting it into a series of binary words noted $\epsilon_k$ at a sampling frequency $f_c$ the same as that of circuit 11. The output of multiplier circuit 14 then delivers a signal represented by the product $\epsilon_K.K_k$; if the value of index k is bad, $K_k$ is near zero and the corresponding value $\epsilon_k$ will not be taken into account. In order to allow for a certain integration time, by taking into account previously measurements of signal $\epsilon_k$, the output of multiplier circuit 14 is connected to an adder circuit 15 whose output is fed back to its second input through delay circuit 17 and multiplier circuit 16 which multiplies the input signal by the coefficient $1-K_k$.

The output of adder circuit 15 is connected to a terminal 30 which delivers the filtered deviation measurement signal noted $F_k$, which is such that:

$$F_k=K_k.\epsilon_k+(1-K_k).F_{k-1}$$

In certain operating conditions, for example in the presence of a target with very fast evolutions, it is necessary to limit the recording of previous deviation measurement values and hence their being recorded.

For this purpose it is necessary to add in the loop between the output of the delay circuit 17 and the input of the multiplier circuit 16 a multiplier circuit 18, which is also connected to the output of a memory 19 whose content is a predetermined positive constant number $\mu$ less than 1, which enables the recording of previous measurements to be limited in time. In this case, signal $F_k$ of the filtered deviation measurement, which is available on terminal 30, can be written:

$$F_k=K_k.\epsilon_K+(1-K_k).F_{k-1}.u.$$

Under conditions of reception which may cause big fluctuations in the signal, it is necessary to use deviation measurement receivers with an automatic gain control. Circuit 27 is then modified. FIG. 2 shows a receiver with A.G.C. with circuit 27 modified in this particular case. This receiver contains a circuit 50, which is connected to the video output of the deviation measurement receiver, the automatic gain control circuit properly speaking receiving the sum $\Sigma$ and difference $\Delta$ signals on two terminals 42 and 43 respectively. Automatic gain control circuit 50 contains two variable gain amplifiers 40 and 41, a quadratic detection circuit 38, a subtraction circuit 37, an amplifier 39 and an amplitude-phase detector 36. Modified circuit 27 includes an integrating circuit 4 which contains, for example, a resistor 34 and a capacitor 35, a subtraction circuit 33 and a circuit 32 that calculates a function g(y) in which y is the signal applied to its input, the choice of function g being determined by the output signal of circuit 32 which must be equivalent to $\Sigma^2/\overline{\Sigma}^2$.

If G is the power gain of amplifiers 40 and 41, this signal coming from amplifier 41 is equal to $\sqrt{G}.\Delta$ and that from amplifier 40 to $\sqrt{G}.\Sigma$.

Amplitude-phase detector 36 calculates the deviation measurement signal $\epsilon$ from signals $\sqrt{G}.\Delta$ and $\sqrt{G}.\Sigma$ coming from amplifiers 40 and 41. Quadratic detection circuit 38 receives signal $\sqrt{G}.\Sigma$ coming from amplifier 41 and delivers at the input of subtraction circuit 37 the signal $\overline{G\Sigma^2}$; this is compared with a predetermined threshold $V_o$, which is available at terminal 44 and fixes the amplitude of the signal that is required at the output of circuit 50.

Signal $(V_o-G\Sigma^2)$ coming from subtraction circuit 37 is amplified by amplifier 39 whose output, which is connected to the gain controls of amplifiers 40 and 41 and to the input of circuit 27, delivers a gain control signal W, which is proportional to signal $V_o-G\Sigma^2$. To ensure the stability of the gain loop with a big variation dynamic of signal $\Sigma$, the gain of amplifiers 40 and 41 must be an exponential function of signal W, i.e.: $G=G_o.10^{-aW}$ in which $G_o$ and $\alpha$ are predetermined positive numbers; when the gain loop is locked on, $G\approx V_o/2$ or $\Sigma^2=(V_o/G_o).10^{aW}$.

Circuit 27, which receives signal W, calculates its mean value $\overline{W}$ by means of integration circuit 4.

Subtraction circuit 33 receives signals W and $\overline{W}$ and delivers to the input of circuit 32 a signal $W-\overline{W}$ such that $$W-\overline{W}=G(\Sigma^2-\overline{\Sigma}^2)$$

Circuit 32 delivers at its output a signal defined by the function $g(w-\overline{w})=10^{\alpha(W-\overline{W})}$ which, because of this, is equal to the signal $U=\Sigma^2/\overline{\Sigma}^2$ previously defined and which is applied together with deviation measurement signal $\epsilon$ to circuit 20 that delivers the filtered deviation measurement $F_k$ at terminal 30.

A device for reducing the scintillation noise for electromagnetic equipments making deviation measurements has thus been described.

What is claimed is:

1. A device for reducing the angular scintillation of moving targets, which is used more especially in electromagnetic equipment making deviation measurements and containing a reception circuit, which reception circuit delivers to terminals of said device the sum signal $\Sigma$, the difference signal $\Delta$, the deviation measurement signal $\epsilon$ calculated from said sum $\Sigma$ and difference $\Delta$ signals, a signal D representing the radar target range and a signal Vr representing the radial speed of the detected target, said device further comprising a first circuit which receives the sum signal $\Sigma$ and delivers signal U representing the normalized fluctuations of the signal $\Sigma^2$ with regard to its mean value $\overline{\Sigma}^2$ and a second circuit which receives signal U and the deviation measurement signal $\epsilon$ and contains a peak detector circuit which delivers the signal V corresponding to the peak values of U, a first means which is supplied with the output signal U of the first circuit and with the output signal V of the peak detector circuit and delivers a signal $x_k = U/V$, a first calculating circuit connected at the output $x_k$ of the first means and calculating the signal $K_k = f(x_k)$ where f is such a predetermined non-linear function that the signal $K_k$ tends rapidly towards 1 or 0 for a small variation of the input signal $x_k$, and a second means, supplied with the output signal $K_k$ of the first calculating circuit and with the deviation measurement signal $\epsilon$ from the reception circuit, delivering the values $F_k = K_k \epsilon + u(1-K_k)F_{k-1}$ of $\epsilon$ which correspond to the maximum values of the sum signal $\Sigma$, $F_{k-1}$ being the preceding filtered value of $\epsilon$ and u a predetermined positive number less or equal to 1.

2. A device for reducing the angular scintillation according to claim 1, wherein the first circuit determining the ratio U comprises at least a squaring circuit which delivers from the sum signal $\Sigma$ available on a first terminal and signal $\Sigma^2$ to the first input of a divider and to an integrator, the output of which integrator is applied to the second input of said divider so said divider supplies at its output the signal:

$$U = \Sigma^2 / \overline{\Sigma}^2$$

3. A device for reducing the angular scintillation according to claim 2, wherein the first circuit further comprises a first adding circuit connected between the output of the integrator and the second input of the divider and a correcting circuit which receives the signal D from a second terminal, the signal $\overline{\Sigma}^2$ delivered by the integrator and the signal Vr from a third terminal and delivers to the second input of said first adding circuit a signal equal to $-4\Sigma hu\ 2.(v_r/D)\tau$, $\tau$ representing the delay time introduced by the integrator.

4. A device for reducing the angular scintillation according to claim 1, wherein the first circuit comprises an integrator the input of which is supplied with a signal W and the output $\overline{W}$ of which is connected to a subtracting circuit, each one of said integrator and subtractor receiving the signal W controlling the gain of first and second amplifiers in a receiver automatic gain control circuit, said first and second amplifiers receiving the difference $\Delta$ and sum $\Sigma$ signals respectively, and a second calculating circuit receiving the output signal $W-\overline{W}$ of the subtractor and delivering signal $U = 1-0^{\alpha(W-\overline{W})}$, in which $\alpha$ is a predetermined positive number.

5. A device for reducing the angular scintillation according to claim 1, wherein said second means comprises a first multiplier fed with the deviation measurement signal $\epsilon$ and with the output signal $K_k$ of the first calculating circuit, a second calculating circuit fed with the output signal $K_k$ of the first calculating circuit and delivering a signal $(1-K_k)$ to the first input of a second multiplier, the output of which is connected to the first input of an adding circuit receiving on its second input and output signal of the first multiplier and supplying its output signal to the input of a delay circuit, the output of which is connected to the second input of the second multiplier through a third multiplier receiving on a second input the contents $\mu$ of a memory, said adding circuit delivering the filtered deviation measurement signal $F_k$.

6. A device for reducing the angular scintillation according to claim 5, wherein said first means comprises a divider circuit calculating the ratio $x = U/V$ of the output signal U of the first circuit to the output signal V of the peak detector circuit, and a first sampling circuit delivering the signals $x_k$ to a first digital circuit coding the amplitude of the samples $x_k$ and further including a second digital circuit coding the amplitude of the deviation measurement signal $\epsilon$ from a first terminal which are first sampled in a second sampling circuit, and fed to said first input to produce signal $K_k$ of said first multiplier, k representing the number of the sample.

* * * * *